US008305371B2

(12) United States Patent
Kim

(10) Patent No.: US 8,305,371 B2
(45) Date of Patent: Nov. 6, 2012

(54) APPARATUS AND METHOD FOR GENERATING VCOM VOLTAGE IN DISPLAY DEVICE WITH BUFFER AMPLIFIER AND CHARGE PUMP

(75) Inventor: Hyoung-Rae Kim, Hwasung (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1202 days.

(21) Appl. No.: 11/973,473

(22) Filed: Oct. 9, 2007

(65) Prior Publication Data

US 2008/0316154 A1 Dec. 25, 2008

(30) Foreign Application Priority Data

Jun. 22, 2007 (KR) ........................ 10-2007-0061655

(51) Int. Cl.
*G06F 3/038* (2006.01)
*G09G 5/00* (2006.01)

(52) U.S. Cl. .......................................... 345/211; 345/95

(58) Field of Classification Search .......... 345/210–212, 345/87–104
See application file for complete search history.

(56) References Cited

U.S. PATENT DOCUMENTS

| | | | | |
|---|---|---|---|---|
| 5,805,130 A * | 9/1998 | Yamamoto et al. | 345/100 |
| 7,138,853 B2 | 11/2006 | Kim et al. | 327/536 |
| 2002/0063703 A1* | 5/2002 | Furuhashi et al. | 345/212 |
| 2002/0145599 A1* | 10/2002 | Endo et al. | 345/211 |
| 2003/0080955 A1* | 5/2003 | Pulvirenti et al. | 345/212 |
| 2003/0184540 A1* | 10/2003 | Kashiyama | 345/212 |
| 2004/0021616 A1* | 2/2004 | Goto et al. | 345/1.1 |
| 2004/0055963 A1* | 3/2004 | Toyozawa et al. | 210/744 |
| 2004/0104875 A1* | 6/2004 | Kim et al. | 345/87 |
| 2004/0145583 A1* | 7/2004 | Morita | 345/211 |
| 2004/0169548 A1* | 9/2004 | Nonaka | 327/536 |
| 2004/0207329 A1* | 10/2004 | Kudo et al. | 315/167 |
| 2005/0156854 A1* | 7/2005 | Park et al. | 345/100 |
| 2005/0156924 A1* | 7/2005 | Nishimura | 345/211 |
| 2005/0195149 A1* | 9/2005 | Ito | 345/98 |
| 2006/0007095 A1* | 1/2006 | Kudo et al. | 345/98 |
| 2006/0132418 A1* | 6/2006 | Morita | 345/98 |
| 2007/0146260 A1* | 6/2007 | Kang | 345/87 |

OTHER PUBLICATIONS

U.S. Patent Application No. US 2005/0206642 to Kushima et al., having Publication date of Sep. 22, 2005.
Korean Patent Publication No. 1020040043221 to Kim et al., having Publication date of May 24, 2004.

* cited by examiner

*Primary Examiner* — Chanh Nguyen
*Assistant Examiner* — Sanghyuk Park
(74) *Attorney, Agent, or Firm* — Monica H. Choi

(57) ABSTRACT

An apparatus for generating a VCOM voltage in a display device includes first and second buffer amplifiers and a charge pump. The first buffer amplifier is biased with high and low rail voltages for generating the VCOM voltage. The second buffer amplifier generates the high rail voltage at an output node not connected to an external capacitor. The charge pump generates the low rail voltage by charge pumping directly from an external power supply voltage. Alternatively, a charge pump and a comparator are used for generating the VCOM voltage at an output of the charge pump. The comparator generates a charge pump control signal from comparing the VCOM voltage with a reference voltage.

25 Claims, 12 Drawing Sheets

APPARATUS AND METHOD FOR GENERATING VCOM VOLTAGE IN DISPLAY DEVICE WITH BUFFER AMPLIFIER AND CHARGE PUMP

CROSS-REFERENCE TO RELATED APPLICATION(S)

The present application claims priority under 35 U.S.C. §119 to Korean Patent Application No. 2007-61655, filed on Jun. 22, 2207, which is incorporated herein by reference in its entirety.

TECHNICAL FIELD

The present invention relates generally to display devices such as LCD (liquid crystal display) devices, and more particularly, to generating a VCOM voltage with increased range and minimized components.

BACKGROUND OF THE INVENTION

FIG. 1 shows a block diagram of a display device 100 according to the prior art. The display device 100 includes a display panel 102 such as a LCD (liquid crystal display) panel, a LSI (liquid crystal display system interface) 104, and a printed circuit board 106. The printed circuit board 106 includes circuit components such as a plurality of external capacitors 108, 109, 110, 111, and 112 coupled to the LSI 104. Such external capacitors 108, 109, 110, 111, and 112 for example are external capacitors Cext1, Cext2, Cext3, Cext4, and Cext5 to be described later herein.

FIG. 2 shows a circuit diagram of an example pixel 120 of the LCD panel 102 of FIG. 1 as known in the prior art. A first capacitor Clc represents a liquid crystal formed for the pixel 120, and a second capacitor Cst is a storage capacitor formed for storing charge when biasing the liquid crystal Clc. A thin film transistor M1 is formed with a source S coupled to first terminals of the capacitors Clc and Cst having second terminals with a common voltage VCOM applied thereon.

The thin film transistor M1 also includes a gate G with a gate signal Vg applied thereon, and a drain D with a drain signal Vd applied thereon. FIG. 2 also shows a gate-to-drain parasitic capacitance Cgd between the gate G and the drain D of the thin film transistor M1. FIG. 2 further shows a gate-to-source parasitic capacitance Cgs between the gate G and the source S of the thin film transistor M1.

FIG. 3 shows a timing diagram of signals during operation of the example pixel 120 of FIG. 2 having undesired kickback voltages. Referring to FIGS. 2 and 3, the drain signal Vd is activated to an active high voltage before time point T1. At time point T1, the gate signal Vg is activated to an active high voltage until time point T2. Between time points T1 and T2, a pixel voltage Vp at the source of the thin film transistor M1 rises to a higher voltage V1 since the drain signal Vd is at the activated high voltage.

At time point T2 when the gate signal Vg drops to a low voltage, the pixel voltage Vp drops by a first kickback voltage Vkb1 which is expressed as follows:

$$Vkb1 = Vgp \times Cgd/(Clc+Cst+Cgd)$$

Vgp above is a total drop in voltage in the gate signal Vg at time point T2. After time point T2, the pixel voltage Vp further decreases according to an RC circuit illustrated in FIG. 4 with Roff being the off-resistance of the thin film transistor M1 and Ct=(Clc+Cst).

Further referring to FIGS. 2 and 3, the gate signal Vg is activated again to the active high voltage at time point T3 until time point T4. Between time points T3 and T4, the pixel voltage Vp decreases to a low voltage V2 since the drain signal Vd is deactivated to a lower voltage. At time point T4 when the gate signal Vg drops to the low voltage, the pixel voltage Vp drops by a second kickback voltage Vkb2 which is expressed as follows:

$$Vkb2 = Vgp \times Cgd/(Clc+Cst+Cgd)$$

After time point T4, the pixel voltage Vp increases according to the RC circuit of FIG. 4.

Such kickback voltages Vkb1 and Vkb2 undesirably cause flickering on the LCD panel 102. Thus, a mechanism for minimizing flickering on the LCD panel 102 from such kickback voltages Vkb1 and Vkb2 is desired.

SUMMARY OF THE INVENTION

Accordingly, in a general aspect of the present invention, a low common voltage VCOML is generated with a level shift to minimize flickering on a display panel from kickback voltages and with increased range and few components.

An apparatus for generating a VCOM voltage in a display device according to an embodiment of the present invention includes a first buffer amplifier, a second buffer amplifier, and a charge pump. The first buffer amplifier is biased with a high rail voltage (VCI_IN) and a low rail voltage (VCL) for generating the VCOM voltage. The second buffer amplifier is configured to generate the high rail voltage at an output node of the second buffer amplifier not connected to an external capacitor. In addition, the charge pump generates the low rail voltage by charge pumping directly from an external power supply voltage.

In an example embodiment of the present invention, the low rail voltage generated from the charge pump is −1 times the external power supply voltage. For example, the high rail voltage is determined from a process maximum voltage rating and the external power supply voltage.

In another embodiment of the present invention, the second buffer amplifier includes an operational amplifier configured as a voltage follower that generates the high rail voltage from a reference voltage. In a further embodiment of the present invention, the first buffer amplifier includes an operational amplifier configured as a voltage regulator that generates the VCOM voltage.

In an example embodiment of the present invention, the charge pump includes a plurality of capacitors, a switching network, and a plurality of level shifters. The switching network switches between the external power supply voltage and a ground voltage for application on the capacitors according to control clock signals. The plurality of level shifters level-shifts the control clock signals to generate level-shifted clock signals that are applied on the switching network for controlling the switching of the switching network. The level shifters are biased either between the external power supply voltage and the ground voltage or between the high and low rail voltages.

An apparatus for generating a VCOM voltage in a display device according to another embodiment of the present invention includes a charge pump and a comparator. The charge pump generates the VCOM voltage by charge pumping directly from an external power supply voltage. The comparator generates a charge pump control signal from comparing the VCOM voltage generated by the charge pump with a reference voltage that indicates a desired VCOM voltage. The charge pump controls the level of the VCOM voltage according to the charge pump control signal.

In an example embodiment of the present invention, a voltage divider generates a modified VCOM voltage from the VCOM voltage generated by the charge pump. In that case, the comparator inputs the modified VCOM voltage and the reference voltage for generating the charge pump control signal.

In this manner, the VCOML voltage is generated with a wider range and fewer external capacitors and small sized buffer amplifiers. The present invention may be used to particular advantage when the display device is a LCD (liquid crystal display) device, and the VCOM voltage is a low common voltage VCOML.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1, 2, 3, 4, 5, 6, 7, 8, 9, 10, 11, 12, 13, 14, 15, 16, 17, and 18 refer to elements having similar structure and/or function.

DETAILED DESCRIPTION

Figure 5:
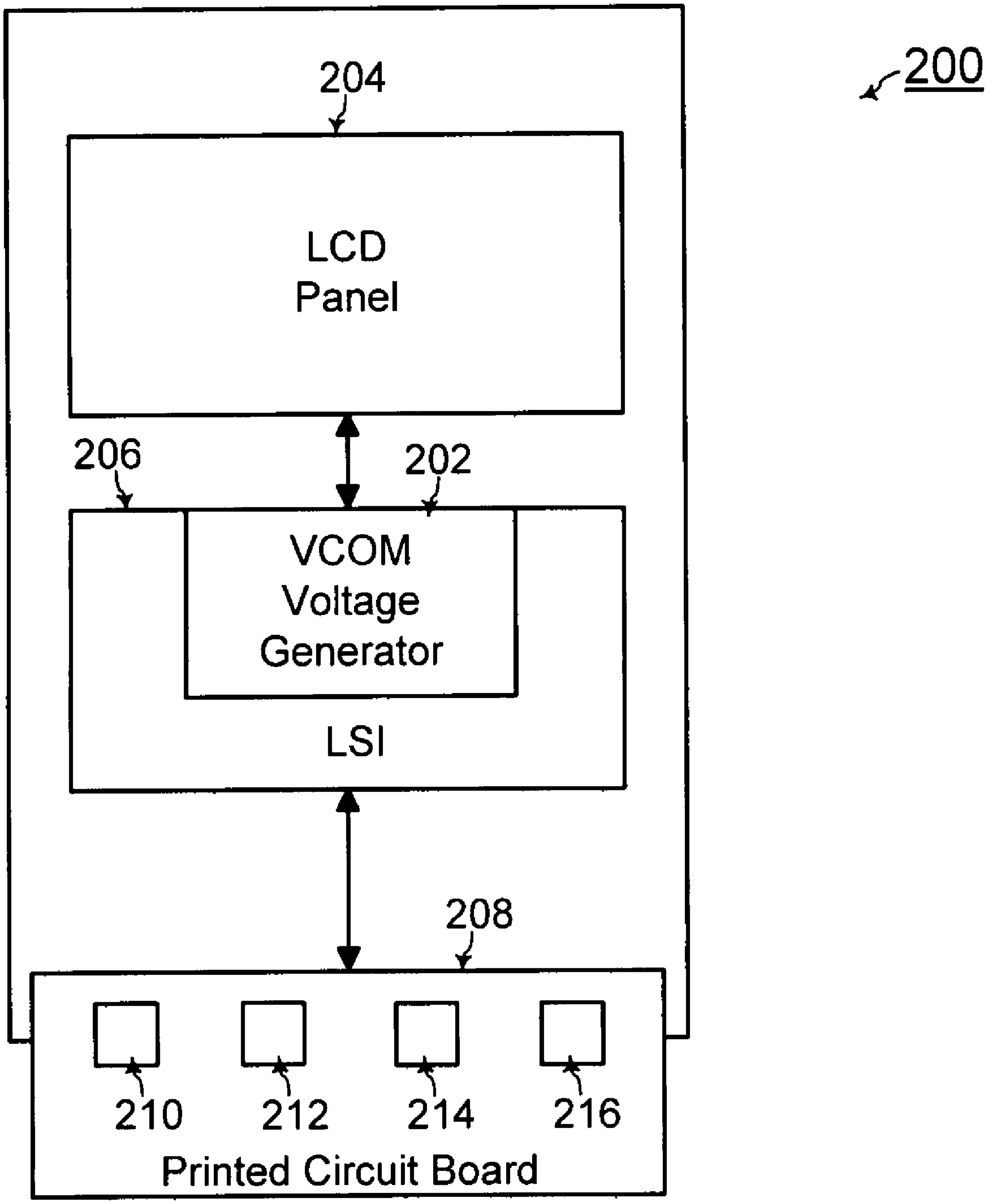
FIG. 5 shows a block diagram of a display device including an apparatus for generating common voltages VCOMH and VCOML, according to an embodiment of the present invention.

FIG. 5 shows a block diagram of a display device 200 with an apparatus 202 for generating a high common voltage VCOMH and a low common voltage VCOML according to an embodiment of the present invention. The display device 200 includes a display panel 204 such as a LCD (liquid crystal display) panel, a LSI (liquid crystal display system interface) 206, and a printed circuit board 208. The printed circuit board 208 includes circuit components such as a plurality of external capacitors 210, 212, 214, and 216 coupled to the LSI 206. Such external capacitors 210, 212, 214, and 216 for example are external capacitors Cext1, Cext2, Cext3, and Cext4 to be described later herein.

Figure 1:
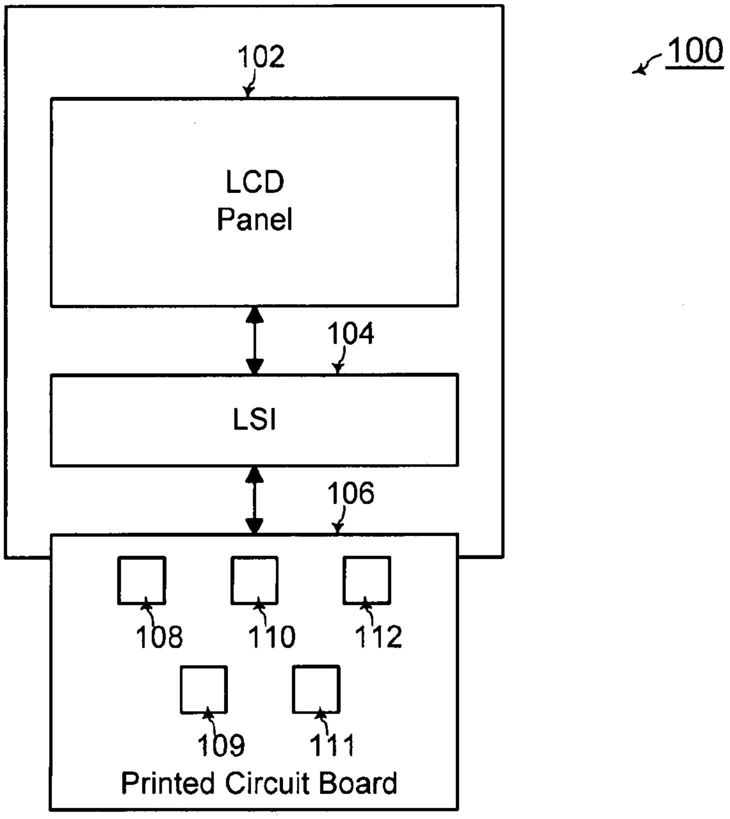
FIG. 1 (Prior Art)
FIG. 1 shows a block diagram of a display device according to the prior art.
Figure 2:
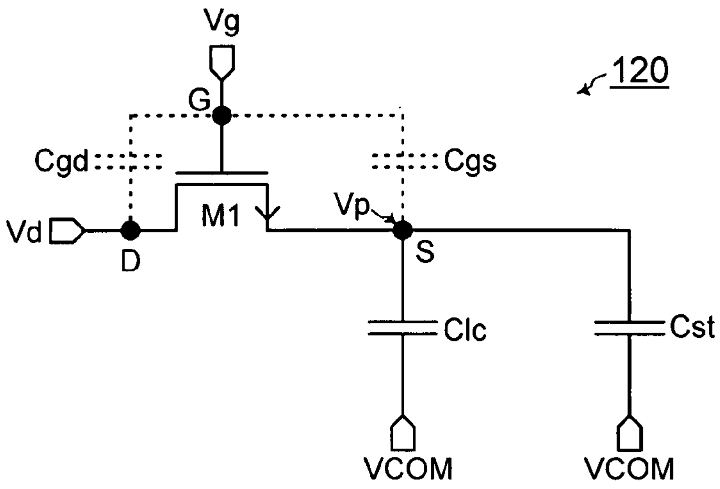
FIG. 2 (Prior Art)
FIG. 2 shows a circuit diagram of an example pixel in a display panel of FIG. 1, according to the prior art.
Figure 3:
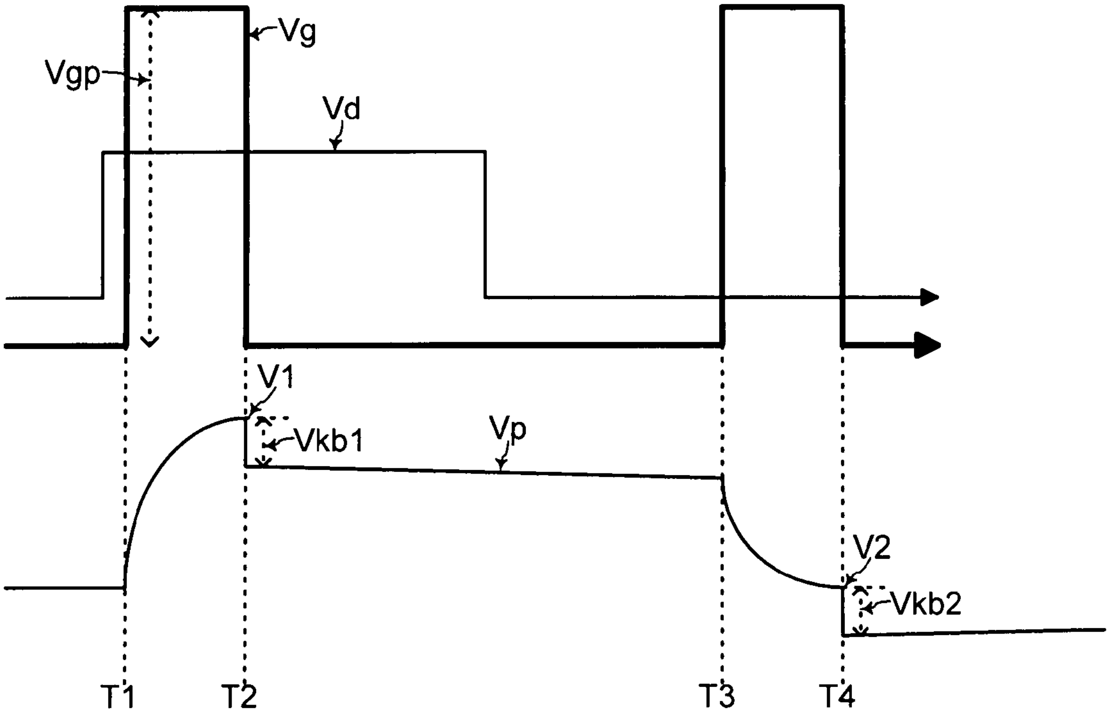
FIG. 3 (Prior Art)
FIG. 3 shows a timing diagram of signals during operation of the pixel of FIG. 2 with kickback voltages, according to the prior art.
Figure 4:
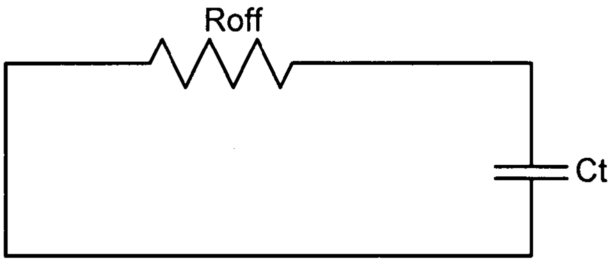
FIG. 4 (Prior Art)
FIG. 4 shows an RC circuit formed in the example pixel circuit of FIG. 2, according to the prior art.

The apparatus 202 for generating the common voltages VCOMH and VCOML is formed as part of the LSI 206, in an embodiment of the present invention. The flickering on the LCD panel 204 of FIG. 5 from any kickback voltages (such as Vkb1 and Vkb2 of FIG. 3) is minimized by adjusting the VCOM voltage applied on the LCD panel 204.

Figure 6:
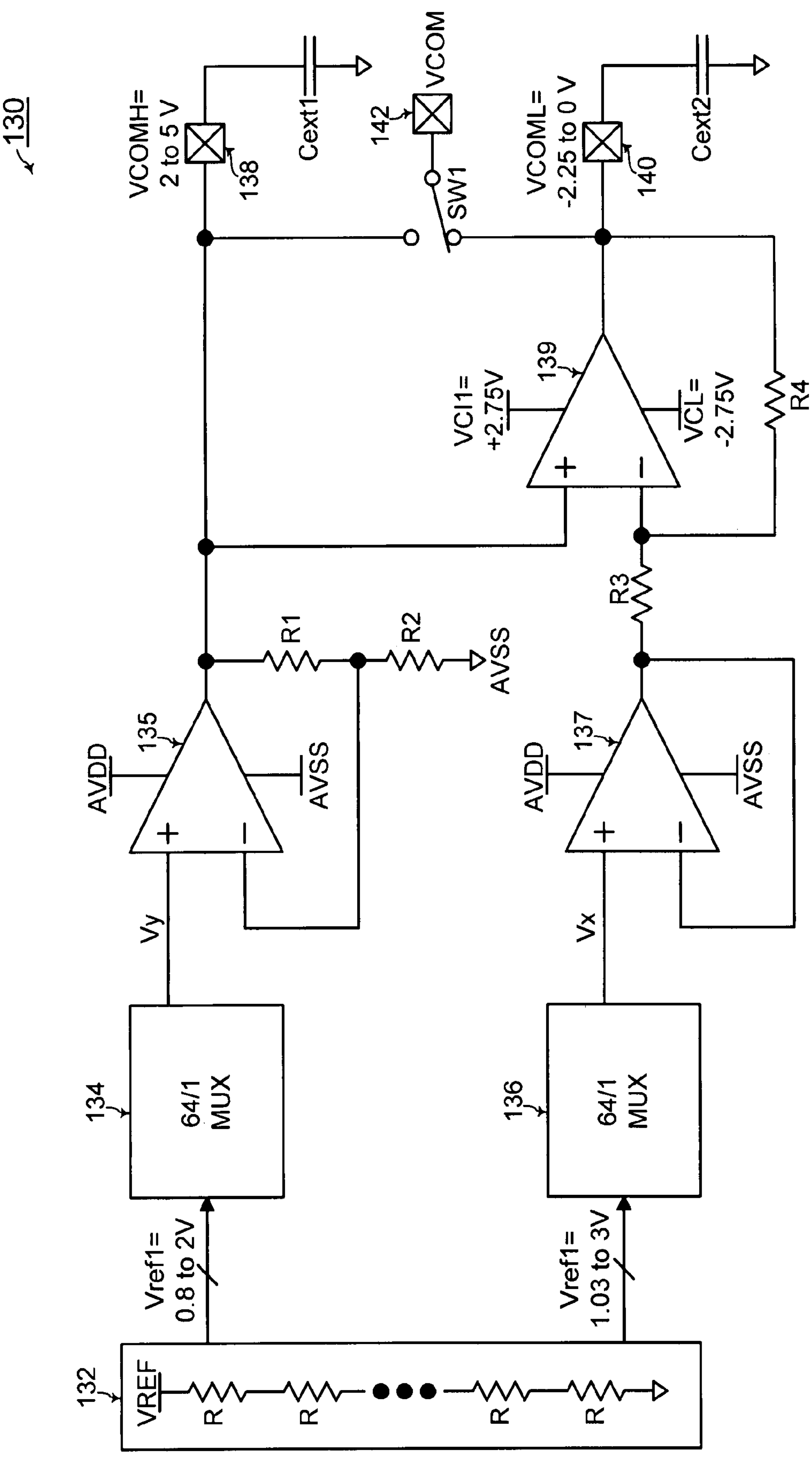
FIG. 6 shows an apparatus for generating high and low common voltages VCOMH and VCOML in the display device of FIG. 5.

FIG. 6 shows an apparatus 130 for generating a high common voltage VCOMH and a low common voltage VCOML. Such an apparatus 130 (such as a VCOM voltage generator 202 in FIG. 5) is formed in the LSI 206 such that the high and low common voltages VCOMH and VCOML are applied on the LCD panel 204.

The apparatus 130 includes a reference voltage generator 132 that includes a plurality of resistors R coupled in series between a reference voltage VREF and a ground node to form a voltage divider. The reference voltage generator 132 provides a first plurality of reference voltages Vref1 in a range of 0.8 Volts to 2.0 Volts to a first multiplexer 134 that selects among such reference voltages to generate a first reference input voltage Vy to a positive input of a first buffer amplifier 135. The reference voltage generator 132 also provides a second plurality of reference voltages Vref2 in a range of 1.03 Volts to 3.0 Volts to a second multiplexer 136 that selects among such reference voltages to generate a second reference input voltage Vx to a positive input of a second buffer amplifier 137.

The apparatus 130 includes a first feedback resistor R1 connected between an output and a negative input of the first buffer amplifier 135 and includes a second feedback resistor R2 connected between the negative input of the first buffer amplifier 135 and a low rail voltage AVSS generated from a source driver power supply (not shown in FIG. 6). The output of the first buffer amplifier 135 is connected to a first contact pad 138 having the high common voltage VCOMH generated thereon. The first contact pad 138 is connected to a first external capacitor Cext1. The resistance values of the feedback resistors R1 and R2 and the first reference input voltage Vy determine the value of the high common voltage VCOMH generated at the output of the first buffer amplifier 135.

The second buffer amplifier 137 has an output connected to a negative input of the second buffer amplifier 137. A third feedback resistor R3 is connected between the output of the second buffer amplifier 137 and a negative input of a third buffer amplifier 139. A fourth feedback resistor R4 is connected between an output of the third buffer amplifier 139 and the negative input of the third buffer amplifier 139.

The output of the third buffer amplifier 139 is connected to a second contact pad 140 having the low common voltage VCOML generated thereon. The second contact pad 140 is connected to a second external capacitor Cext2. The resistance values of the feedback resistors R3 and R4, the high common voltage VCOMH, and the second reference input voltage Vx determine the value of the low common voltage VCOML generated at the output of the third buffer amplifier 139. Further in the apparatus 130 of FIG. 6, a switch SW1 selects one of the high common voltage VCOMH and the low common voltage VCOML as the common voltage VCOM applied on the example pixel 120 via a third contact pad 142.

Figure 7:
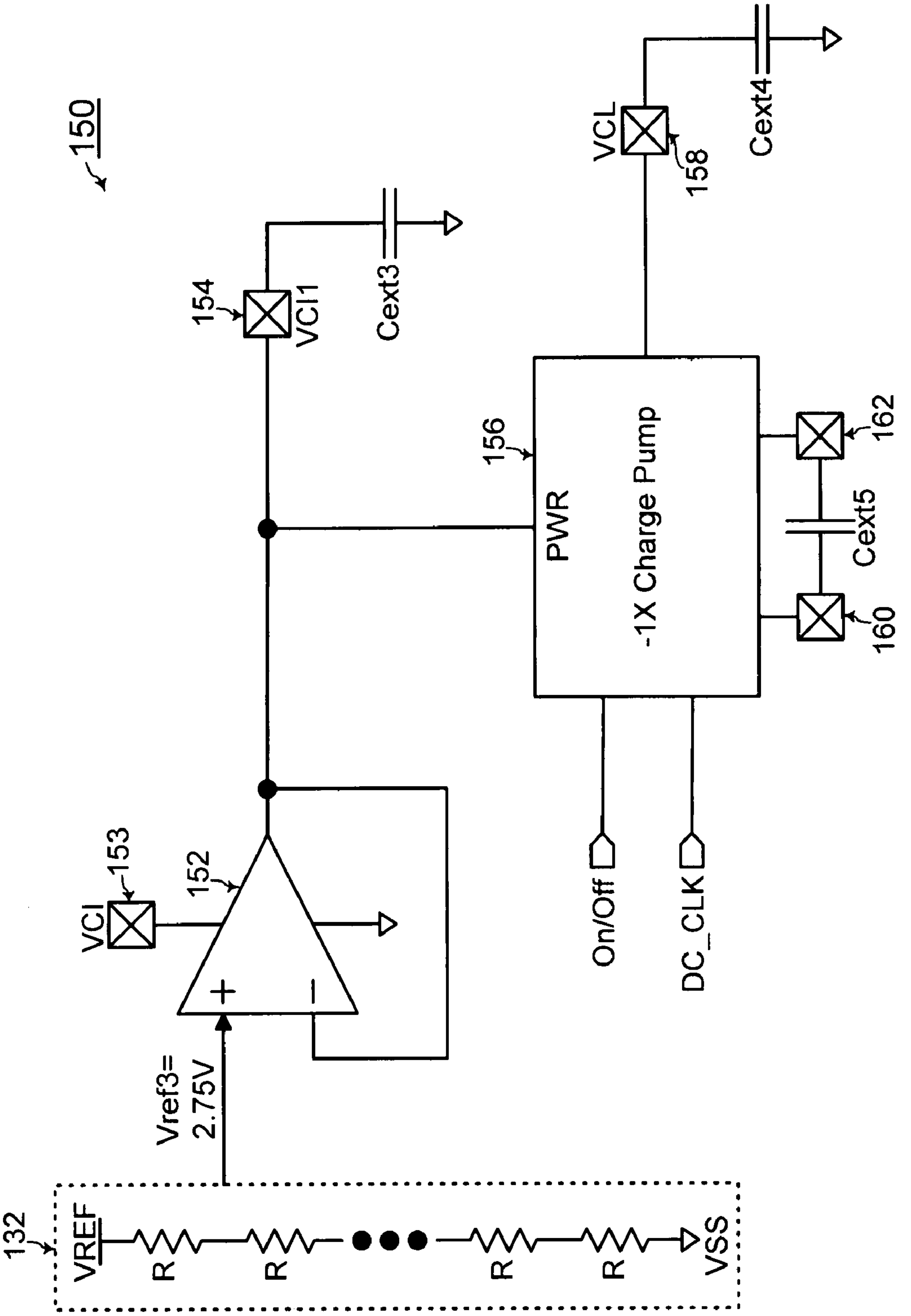
FIG. 7 shows a bias voltage generator for generating bias voltages for the apparatus of FIG. 6.

In FIG. 6, the first and second buffer amplifiers 135 and 137 are each biased between a high rail voltage AVDD and the low rail voltage AVSS that are generated from the source driver power supply (not shown in FIG. 6). Further in FIG. 6, the third buffer amplifier 139 is biased with a high bias voltage VCI1=+2.75 Volts and a low bias voltage VCL=−2.75 Volts for a rail to rail voltage of 5.5 Volts. FIG. 7 shows a bias voltage generator 150 for generating such bias voltages VCI1=+2.75 Volts and VCL=−2.75 Volts. The bias voltage generator 150 is formed as part of the LSI 206 in FIG. 5.

The bias voltage generator 150 includes a fourth buffer amplifier 152 having a positive input with a third reference voltage Vref3=+2.75 Volts applied thereon from the reference voltage generator 132. An output and a negative input of the fourth buffer amplifier 152 are connected in feedback. The output of the fourth buffer amplifier 152 is connected to a fourth contact pad 154 having the bias voltage VCI1=+2.75 Volts generated thereon. The fourth contact pad 154 is connected to a third external capacitor Cext3.

The output of the fourth buffer amplifier 152 is connected to an input of a charge pump 156. The charge pump 156 is a −1 X charge pump that generates the bias voltage VCL=−2.75 Volts from the input bias voltage VCI1=+2.75 Volts. An output of the charge pump 156 is connected to a fifth contact pad 158 having the VCL=−2.75 Volts generated thereon.

The fifth contact pad 158 is connected to a fourth external capacitor Cext4. A fifth external capacitor Cext5 is connected to the charge pump 156 via sixth and seventh contact pads 160 and 162. The fourth buffer amplifier 152 is biased between an external voltage VCI applied on an eighth contact pad 153 and the ground node. The external voltage VCI is generated from an external source outside of the LSI 206 in FIG. 5.

Figure 8:
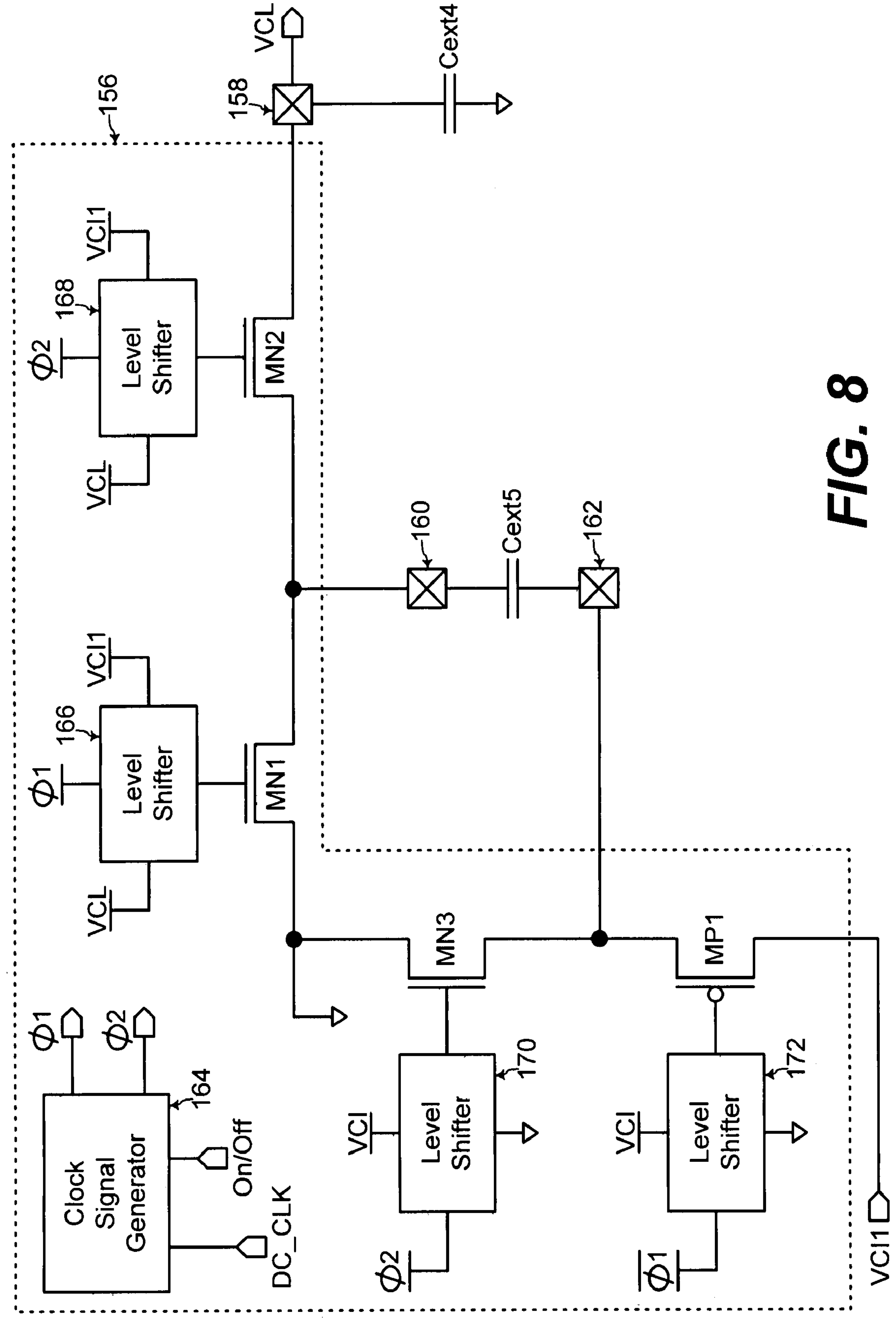
FIG. 8 shows components of a charge pump in the bias voltage generator of FIG. 7.

FIG. 8 shows components of the −1 X charge pump 156 of FIG. 7. The charge pump 156 includes a clock signal generator 164 that generates first and second clock signals ϕ1 and ϕ2. The charge pump 156 also includes a first NMOSFET (N-channel metal oxide semiconductor field effect transistor) MN1 connected between the sixth contact pad 160 and the ground node and having a gate connected to a first level shifter 166. The first level shifter 166 level-shifts the first clock signal ϕ1 and is biased by the bias voltages VCI1=+2.75 Volts and VCL=−2.75 Volts.

The charge pump 156 further includes a second NMOSFET MN2 connected between the fifth and sixth contact pads 158 and 160 and having a gate connected to a second level shifter 168. The second level shifter 168 level-shifts the second clock signal ϕ2 and is biased by the bias voltages VCI1=+2.75 Volts and VCL=−2.75 Volts. The charge pump 156 also includes a third NMOSFET MN3 connected between the ground node and the seventh contact pad 162 and having a gate connected to a third level shifter 170. The third level shifter 170 level-shifts the second clock signal ϕ2 and is biased between the external voltage VCI and the ground node.

The charge pump 156 further includes a first PMOSFET (P-channel metal oxide semiconductor field effect transistor) MP1 connected between the seventh contact pad 162 and the fourth contact pad 154 generating the bias voltage VCI1. The first PMOSFET MP1 also has a gate connected to a fourth level shifter 172 that level-shifts an inversion of the first clock signal ϕ1 and is biased between the external voltage VCI and the ground node.

Figure 9:
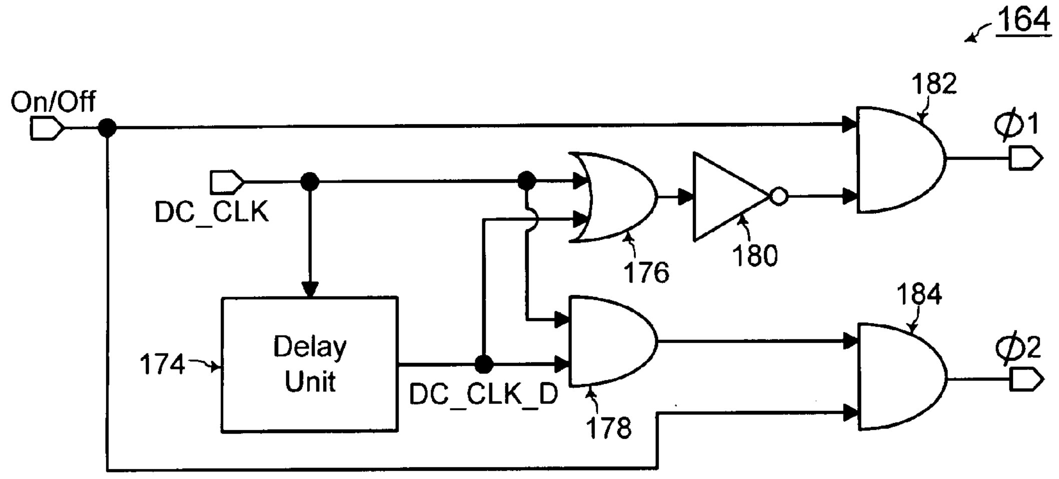
FIG. 9 shows a circuit diagram of a clock signal generator in the charge pump of FIG. 8.
Figure 10:
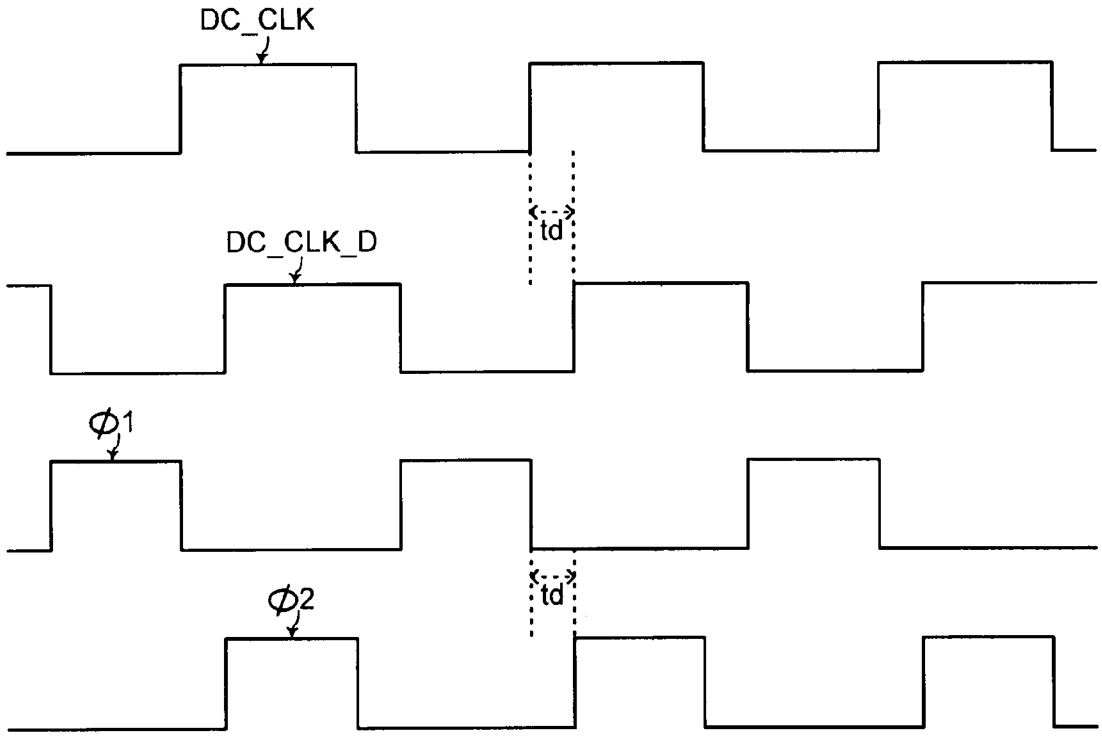
FIG. 10 shows a timing diagram of signals during operation of the clock signal generator of FIG. 9.

FIG. 9 shows components of the clock signal generator 164 of FIG. 8, and FIG. 10 shows a timing diagram of signals during operation of the clock signal generator 164 of FIG. 8. The clocks signal generator 164 receives an initial clock signal DC_CLK and includes a delay unit 174 that generates a delayed clock signal DC_CLK_D from the initial clock signal DC_CLK. The delayed clock signal DC_CLK_D is the initial clock signal DC_CLK that is delayed by a delay time td.

The clock signal generator 164 includes an OR-gate 176 that inputs the initial clock signal DC_CLK and the delayed clock signal DC_CLK_D. The clock signal generator 164 also includes a first AND-gate 178 that inputs the initial clock signal DC_CLK and the delayed clock signal DC_CLK_D. The clock signal generator 164 further includes an inverter 180, a second AND-gate 182, and a third AND-gate 184.

The inverter 180 inputs an output of the OR-gate 176. The second AND-gate 182 inputs the output of the inverter 180 and an On/Off signal to generate the first clock signal ϕ1. The third AND-gate 184 inputs the output of the first AND-gate 178 and the On/Off signal to generate the second clock signal ϕ2. The On/Off signal determines whether the charge pump 156 continues to pump charge to/from the fourth external capacitor Cext4. Thus, the second and third AND-gates 182 and 184 are pass-gates for the first and second clock signals ϕ1 and ϕ2. Referring to FIG. 10, the first and second clock signals ϕ1 and ϕ2 are generated from the clock signal generator 164 with a non-overlap time of the delay time td.

Referring to FIGS. 6 and 7, for generating the VCOMH and VCOML voltages, five external capacitors Cext1, Cext2, Cext3, Cext4, and Cext5 are used. Such external capacitors are mounted on the printed circuit board 208 in FIG. 5 and such external capacitors increase the size and weight of the display device 200.

In addition, the bias voltage VCI1 is coupled to both the third buffer amplifier 139 and the charge pump 156. Thus, the charge pump 156 may have low boosting efficiency with less available current capacity from the fourth buffer amplifier 152. Furthermore, the fourth buffer amplifier 152 is sized to be relatively large for generating the bias voltage VCI1 coupled to both the third buffer amplifier 139 and the charge pump 156. Also, an external capacitor Cext3 is used for stabilizing the bias voltage VCI1 coupled to both the third buffer amplifier 139 and the charge pump 156.

Furthermore, the third buffer amplifier 139 is relatively large sized for providing the current load to the second contact pad 140 that is coupled to the LCD panel 102. The third buffer amplifier 139 has a voltage margin requirement of 0.5 Volts at its output. Thus, the possible voltage range of VCOML generated at the output of the third buffer amplifier 139 is −2.25 Volts to 0 Volts in FIG. 6. However, for reducing the undesired flickering on the LCD panel 204 from any kickback voltage, the low common voltage VCOML is desired to be reduced to a more negative voltage than −2.25 Volts.

Figure 11:
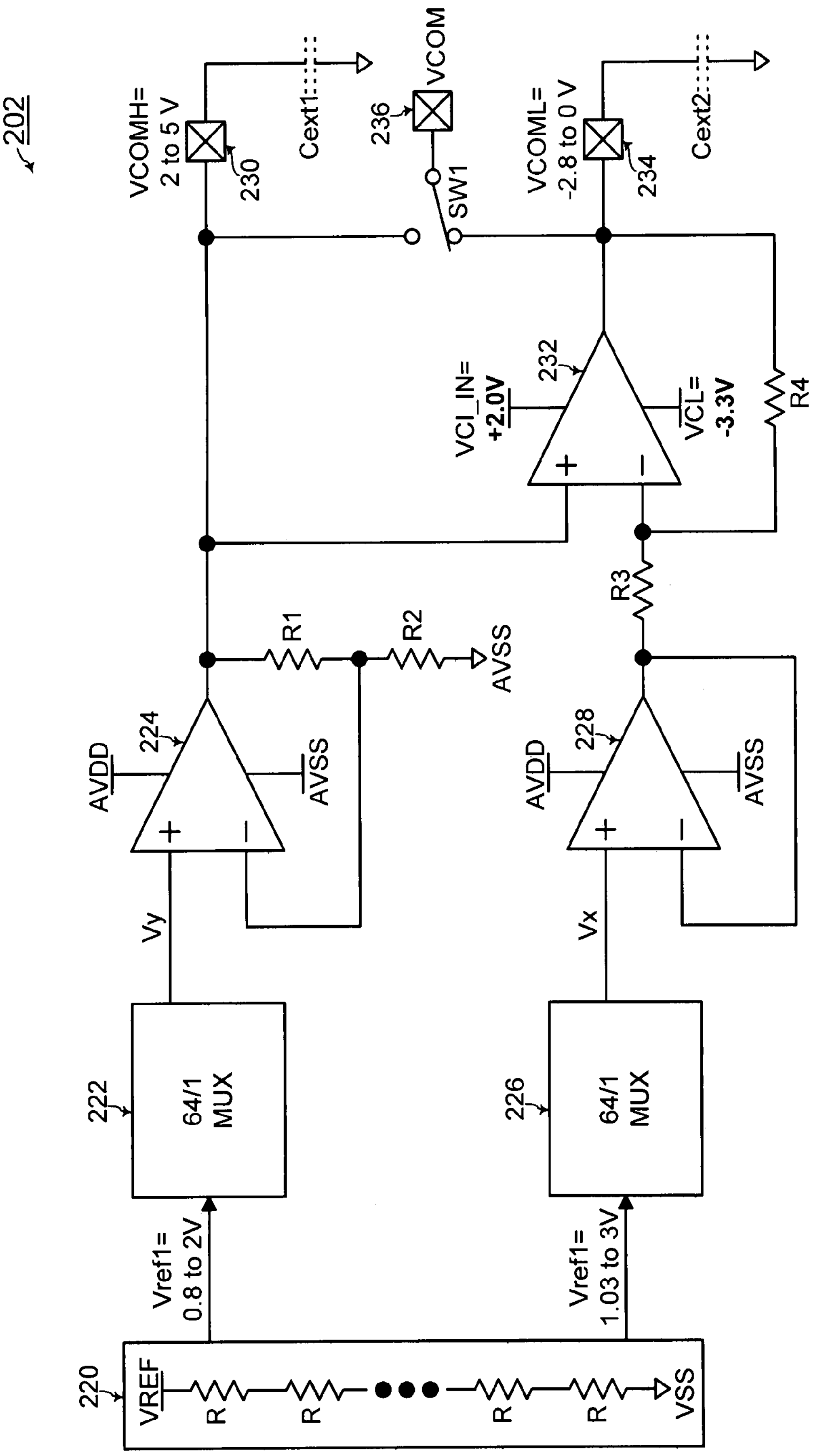
FIG. 11 shows components of the apparatus for generating high and low common voltages VCOMH and VCOML in the display device of FIG. 5, according to one embodiment of the present invention.

FIG. 11 shows a circuit diagram of the apparatus 202 for generating the common voltages VCOMH and VCOML without such disadvantages according to an example embodiment of the present invention. The apparatus 202 includes a reference voltage generator 220 that includes a plurality of resistors R coupled in series between a reference voltage VREF and a ground node to form a voltage divider. The reference voltage generator 220 provides a first plurality of reference voltages Vref1 in a range of 0.8 Volts to 2.0 Volts to a first multiplexer 222 that selects among such reference voltages to generate a first reference input voltage Vy to a positive input of a first buffer amplifier 224. The reference voltage generator 220 also provides a second plurality of reference voltages Vref2 in a range of 1.03 Volts to 3.0 Volts to a second multiplexer 226 that selects among such reference voltages to generate a second reference input voltage Vx to a positive input of a second buffer amplifier 228.

The apparatus 202 includes a first feedback resistor R1 connected between an output and a negative input of the first buffer amplifier 224 and includes a second feedback resistor R2 connected between the negative input of the first buffer amplifier 224 and a low rail voltage AVSS generated from a source driver power supply (not shown in FIG. 11) of the LSI 206. The output of the first buffer amplifier 224 is connected to a first contact pad 230 having the high common voltage VCOMH generated thereon. The first contact pad 230 is connected to a first external capacitor Cext1. The resistance values of the feedback resistors R1 and R2 and the first reference input voltage Vy determine the value of the high common voltage VCOMH generated at the output of the first buffer amplifier 224.

The second buffer amplifier 228 has an output connected to a negative input of the second buffer amplifier 228. A third feedback resistor R3 is connected between the output of the second buffer amplifier 228 and a negative input of a third buffer amplifier 232. A fourth feedback resistor R4 is connected between an output of the third buffer amplifier 232 and the negative input of the third buffer amplifier 232. For example, the third buffer amplifier 232 is an operational amplifier configured as a voltage regulator with the feedback resistors R3 and R4.

The output of the third buffer amplifier 232 is connected to a second contact pad 234 having the low common voltage VCOML generated thereon. The second contact pad 234 is connected to a second external capacitor Cext2. The external capacitors Cext1 and Cext2 are formed on the printed circuit board 208 in FIG. 5, in an embodiment of the present invention, and are thus shown outlined in dashed lines in FIG. 11. Other components of the apparatus 202 for generating the common voltages VCOMH and VCOML are formed as part of the LSI 206, in an embodiment of the present invention.

The resistance values of the feedback resistors R3 and R4, the high common voltage VCOMH, and the second reference input voltage Vx determine the value of the low common voltage VCOML generated at the output of the third buffer amplifier 232. Further in the apparatus 202 of FIG. 11, a switch SW1 selects one of the high common voltage VCOMH and the low common voltage VCOML as the common voltage VCOM applied on pixels of the display panel 204 via a third contact pad 236.

Figure 12:
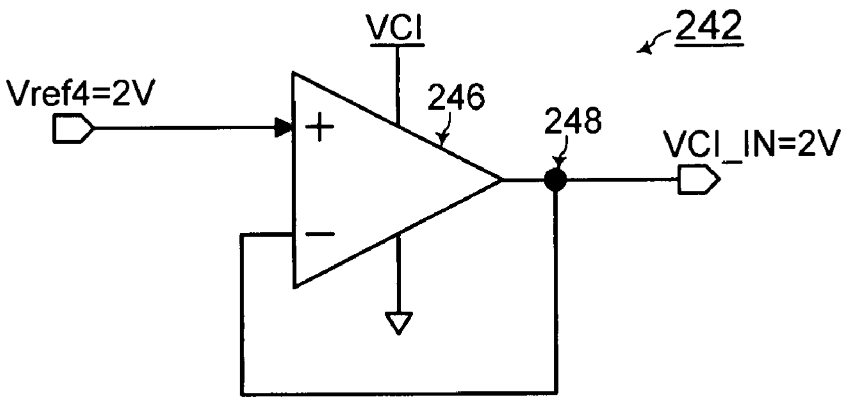
FIGS. 12 and 13 show rail voltage generators for generating rail voltages used by the apparatus of FIG. 11, according to an embodiment of the present invention.

In FIG. 11, the first and second buffer amplifiers 224 and 228 are each biased between a high rail voltage AVDD and the low rail voltage AVSS that are generated from the source driver power supply (not shown in FIG. 11) of the LSI 206. Further in FIG. 11 according to an aspect of the present invention, the third buffer amplifier 232 is biased with a high rail voltage VCI_IN=+2.0 Volts and a low rail voltage VCL=−3.3 Volts. FIG. 12 shows a first rail voltage generator 242 for generating such a high rail voltage VCI_IN=+2.0 Volts, and FIG. 13 shows a second rail voltage generator 244 for generating such a low rail voltage VCL=−3.3 Volts.

Referring to FIG. 12, the first rail voltage generator 242 includes a fourth buffer amplifier 246 having a positive input with a third reference voltage Vref3=+2.0 Volts applied thereon from the reference voltage generator 220. The fourth buffer amplifier 246 has a buffer output node 248 that is connected to a negative input of the fourth buffer amplifier 246 in feedback. For example, the fourth buffer amplifier 246 may be an operational amplifier configured as a voltage follower. The buffer output node 248 of the fourth buffer amplifier 246 has the high rail voltage VCI_IN=+2.0 Volts generated thereon. Note that the buffer output node 248 is not connected to any external capacitor via any contact pad in FIG. 12.

Figure 13:
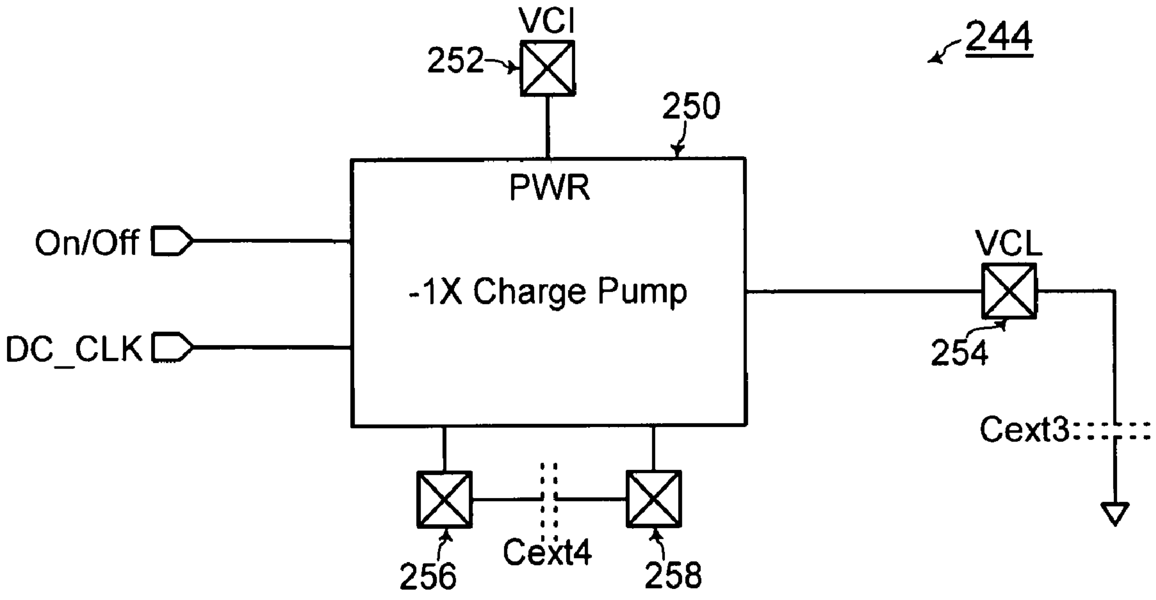

Referring to FIG. 13, the second rail voltage generator 244 includes a −1 X charge pump 250. The charge pump 250 generates the low rail voltage VCL=−3.3 Volts directly from an external power supply voltage VCI=+3.3 Volts. The external power supply voltage VCI=+3.3 Volts is applied from an external power source (not shown) that is outside of the LSI 206 via a third contact pad 252. The charge pump 250 generates the low rail voltage VCL=−3.3 Volts that is −1 times the external power supply voltage VCI=+3.3 Volts.

The charge pump 250 generates the low rail voltage VCL=−3.3 Volts at an output that is connected to a fourth contact pad 254. The fourth contact pad 254 is connected to a third external capacitor Cext3. A fourth external capacitor Cext4 is connected to the charge pump 250 via fifth and sixth contact pads 256 and 258. The fourth buffer amplifier 246 in FIG. 12 is biased between the external power supply voltage VCI and the ground node.

The first rail voltage generator 242 of FIG. 12 and the second rail voltage generator 244 of FIG. 13 are formed as part of the LSI 206 in FIG. 10, according to one embodiment of the present invention. The external capacitors Cext3 and Cext4 however are formed on the printed circuit board 208, according to one embodiment of the present invention.

Figure 14:
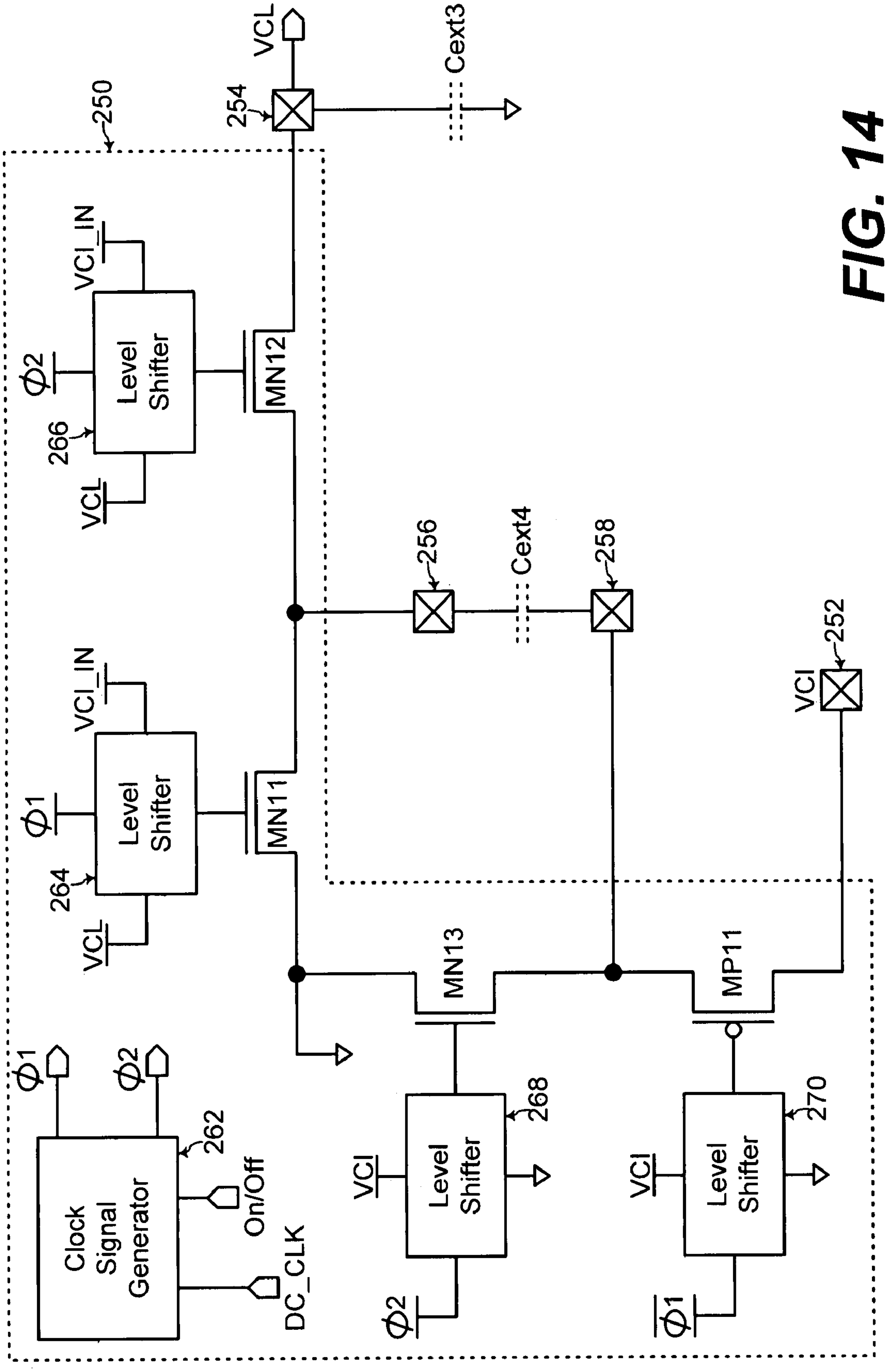
FIG. 14 shows components of a charge pump in the rail voltage generator of FIG. 13, according to an embodiment of the present invention.

FIG. 14 shows components of the −1 X charge pump 250 of FIG. 13 according to an embodiment of the present invention. The charge pump 250 includes a clock signal generator 262 that generates first and second control clock signals $\phi$1 and $\phi$2. The charge pump 262 also includes a first NMOSFET (N-channel metal oxide semiconductor field effect transistor) MN11 connected between the fifth contact pad 256 and the ground node and having a gate connected to a first level shifter 264. The first level shifter 264 level-shifts the first clock signal $\phi$1 to the gate of the NMOSFET MN11 and is biased by the rail voltages VCI_IN=+2.0 Volts and VCL=−3.3 Volts.

The charge pump 250 further includes a second NMOSFET MN12 connected between the fourth and fifth contact pads 254 and 256 and having a gate connected to a second level shifter 266. The second level shifter 266 level-shifts the second clock signal $\phi$2 to the gate of the NMOSFET MN12 and is biased by the rail voltages VCI_IN=+2.0 Volts and VCL=−3.3 Volts. The charge pump 250 also includes a third NMOSFET MN13 connected between the ground node and the sixth contact pad 258 and having a gate connected to a third level shifter 268. The third level shifter 268 level-shifts the second clock signal $\phi$2 and is biased between the external power supply voltage VCI and the ground node.

The charge pump 250 further includes a first PMOSFET (P-channel metal oxide semiconductor field effect transistor) MP11 connected between the sixth contact pad 258 and the third contact pad 252 having the external power supply voltage VCI applied thereon. The first PMOSFET MP11 also has a gate connected to a fourth level shifter 270 that level-shifts an inversion of the first clock signal $\phi$1 and is biased between the external power supply voltage VCI and the ground node. The clock signal generator 262 generates the first and second clock signals $\phi$1 and $\phi$2 from an initial clock signal DC_CLK and a charge pump control signal On/Off similarly as described in reference to FIGS. 8 and 9.

The MOSFETs MN11, MN12, MN13, and MP11 form a switching network for switching between the external power supply voltage VCI and a ground voltage of the ground node for application on the external capacitors Cext3 and Cext4. The level shifters 264, 266, 268, and 270 provide the control clock signals ϕ1 and ϕ2 that are level-shifted for controlling the MOSFETs MN11, MN12, MN13, and MP11.

Note that a process maximum voltage rating for the level shifters 264 and 266 and for the third buffer amplifier 232 is +5.5 Volts. Such a process maximum voltage rating is determined by the maximum allowed voltage difference between the rail voltages VCI_IN and VCL that does not damage integrated circuit structures. The low rail voltage VCL is determined by the external power supply voltage VCI since VCL=−1 times VCI as generated by the −1 X charge pump 250.

The maximum allowed high rail voltage VCI_IN is then determined by the process maximum voltage rating of +5.5 Volts and the external power supply voltage VCI since the process maximum voltage rating should be greater than VCI_IN minus VCL. In one embodiment of the present invention, VCI_IN=2.0 Volts when VCI=3.3 Volts with a margin of 0.2 Volts for VCI.

Additionally referring to FIG. 11, the third buffer amplifier 232 has a voltage margin requirement of 0.5 Volts. With the low rail voltage VCL=−3.3 Volts, the low common voltage VCOML may be generated to be in a range of −2.8 Volts to 0 Volts. Thus, the low common voltage VCOML may be generated to have the lower voltage of −2.8 Volts in the apparatus 202 of FIG. 11 according to the present invention in contrast to the −2.25 Volts in the apparatus 130 of FIG. 6.

Further referring to FIGS. 11 and 12, the high rail voltage VCI_IN=+2.0 Volts generated by the fourth buffer amplifier 246 is not received by the PWR input for the −1 X charge pump 250. Thus, the output node 248 of the fourth buffer amplifier 246 does not drive the −1 X charge pump 250. Consequently, an external capacitor is not connected to the output node 248 of the fourth buffer amplifier 246 such that the number of external capacitors mounted on the printed circuit board 208 is advantageously minimized.

Also, the size of the transistors such as the MOSFETs (metal oxide semiconductor field effect transistors) forming the fourth buffer amplifier 246 may be smaller since the fourth buffer amplifier 246 does not provide the current to drive the −1 X charge pump 250. Thus, the fourth buffer amplifier 246 for generating the high rail voltage VCI_IN in FIG. 12 according to the present invention may be formed more compactly with smaller area than the fourth buffer amplifier 152 for generating the bias voltage VCI1 in FIG. 7.

In addition, note that the external power supply voltage VCI having a higher voltage of +3.3 Volts is applied at the PWR input (i.e., on the contact pad 252 in FIG. 14) of the −1 X charge pump 250 of the present invention in contrast to the lower voltage of VCI1=+2.75 Volts used by the −1 X charge pump 156 in FIG. 8. Such higher voltage of +3.3 Volts as provided directly by an external power supply source results in higher boosting efficiency for the −1 X charge pump 250 of the present invention.

Figure 15:
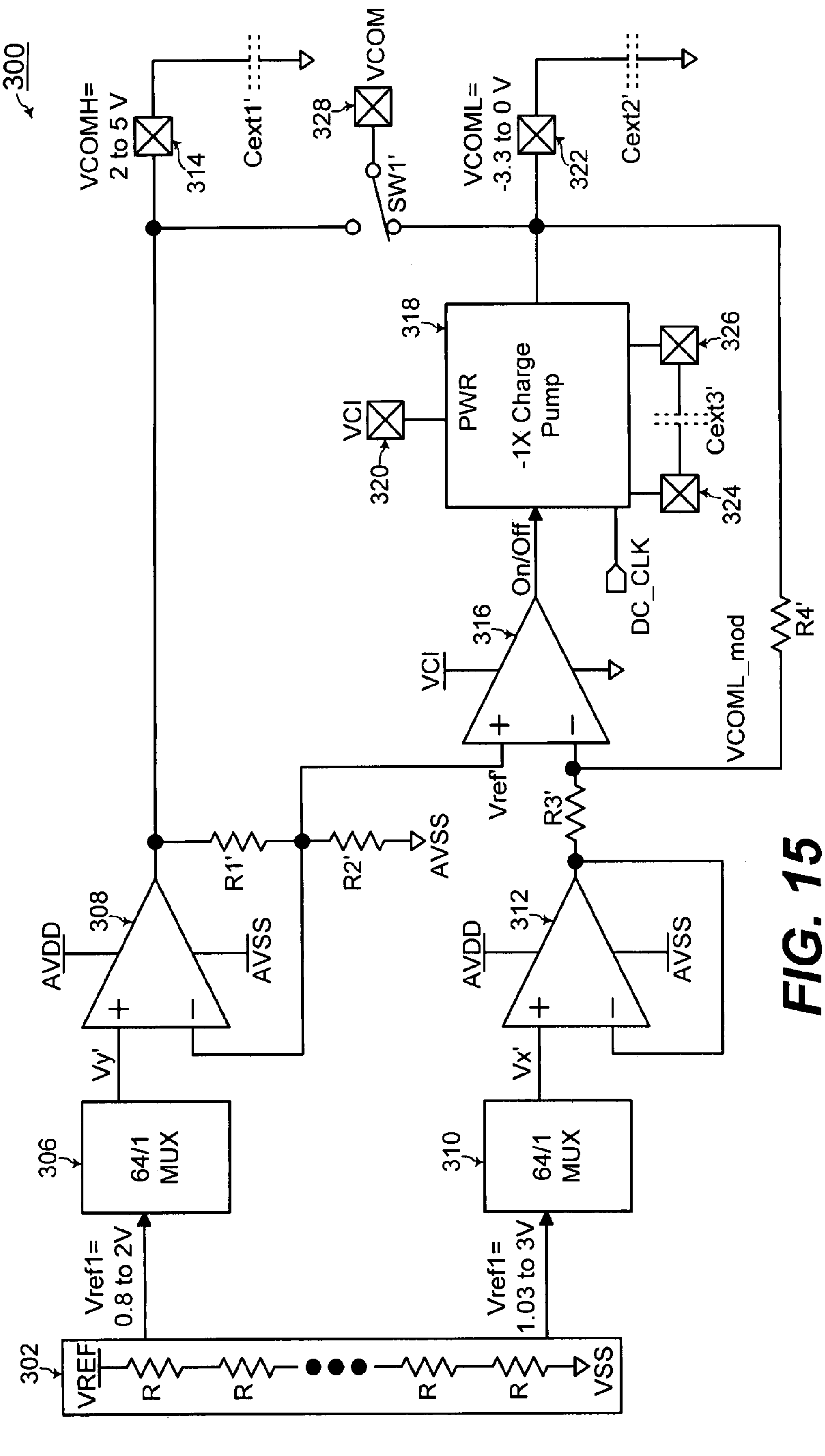
FIG. 15 shows components of the apparatus for generating high and low common voltages VCOMH and VCOML in the display device of FIG. 5, according to another embodiment of the present invention.

FIG. 15 shows a circuit diagram of an apparatus 300 for generating the common voltages VCOMH and VCOML according to another example embodiment of the present invention. The apparatus 300 of FIG. 15 may be used instead of the apparatus 202 of FIG. 11 for generating the common voltages VCOMH and VCOML.

Referring to FIG. 15, the apparatus 300 includes a reference voltage generator 302 that includes a plurality of resistors R coupled in series between a reference voltage VREF and a ground node to form a voltage divider. The reference voltage generator 302 provides a first plurality of reference voltages Vref1 in a range of 0.8 Volts to 2.0 Volts to a first multiplexer 306 that selects among such reference voltages to generate a first reference input voltage Vy' to a positive input of a first buffer amplifier 308. The reference voltage generator 302 also provides a second plurality of reference voltages Vref2 in a range of 1.03 Volts to 3.0 Volts to a second multiplexer 310 that selects among such reference voltages to generate a second reference input voltage Vx' to a positive input of a second buffer amplifier 312.

The apparatus 300 also includes a first feedback resistor R1' connected between an output and a negative input of the first buffer amplifier 308 and includes a second feedback resistor R2' connected between the negative input of the first buffer amplifier 308 and a low rail voltage AVSS generated from a source driver power supply (not shown in FIG. 15) of the LSI 206. The output of the first buffer amplifier 308 is connected to a first contact pad 314 having the high common voltage VCOMH generated thereon. The first contact pad 314 is connected to a first external capacitor Cext1'. The resistance values of the feedback resistors R1' and R2' and the first reference input voltage Vy' determine the value of the high common voltage VCOMH generated at the output of the first buffer amplifier 308.

The second buffer amplifier 312 has an output connected to a negative input of the second buffer amplifier 312. A third feedback resistor R3' is connected between the output of the second buffer amplifier 312 and a negative input of a third buffer amplifier 316. The output of the third buffer amplifier 316 is used as the On/Off control signal to a −1 X charge pump 318. The −1 X charge pump 318 of FIG. 15 is implemented similarly as illustrated in FIG. 14. A second contact pad 320 in FIG. 15 is similar to the contact pad 252 in FIG. 14 and has the external power supply voltage VCI=+3.3 Volts applied thereon for driving the −1 X charge pump 318.

The −1 X charge pump 318 generates the low common voltage VCOML at an output node connected to a third contact pad 322. The third contact pad 322 is connected to a second external capacitor Cext2'. In addition, a third external capacitor Cext3' is connected to the −1 X charge pump 318 via fourth and fifth contact pads 324 and 326. The external capacitors Cext1', Cext2', and Cext3' are formed on the printed circuit board 208 in FIG. 5, in an embodiment of the present invention, and are thus shown outlined in dashed lines in FIG. 15.

Other components of the apparatus 300 for generating the common voltages VCOMH and VCOML are formed as part of the LSI 206, in an embodiment of the present invention. Further in the apparatus 300 of FIG. 15, a switch SW1' selects one of the high common voltage VCOMH and the low common voltage VCOML as the common voltage VCOM applied on pixels of the display panel 204 via a sixth contact pad 328.

A fourth feedback resistor R4' is connected between an output of the −1 X charge pump 318 and the negative input of the third buffer amplifier 316. The positive input of the third buffer amplifier 316 is connected to the negative input of the first buffer amplifier 308. The third buffer amplifier 316 forms a comparator that generates the charge pump control signal On/Off from comparing a modified low common voltage VCOML_mod generated at the negative input of the third buffer amplifier 316 and a reference voltage Vref' generated at the positive input of the third buffer amplifier 316.

The modified low common voltage VCOML_mod is generated by a voltage divider formed by the feedback resistors R3' and R4' between the output of the charge pump 318 and the output of the second buffer amplifier 312. The reference voltage Vref' indicates a desired level of the low common voltage VCOML. The charge pump 318 is controlled by the charge pump control signal On/Off from the third buffer amplifier 316 to generate the low common voltage VCOML with such a desired level.

Note that the −1 X charge pump 318 is implemented similarly as described in reference to FIG. 14 herein. In that case, the high rail voltage generator 242 is also formed in the LSI 206 for generating the VCI_IN=+2 Volts used for biasing the level shifters 264 and 266 in the −1 X charge pump 318. In addition, note that such level shifters 264 and 266 in the −1 X charge pump 318 would each be biased between VCI_IN=+2 Volts and VCOML=−3.3 Volts.

Referring to FIG. 15, the third buffer amplifier 316 is biased between the external power supply voltage VCI and the ground node. Because the output of the third buffer amplifier 316 is used just as the charge pump control signal On/Off, the third buffer amplifier 316 may be formed compactly with small-sized MOSFETs. In addition, the high rail voltage generator 242 would be formed just for biasing the level shifters 264 and 266 in the −1 X charge pump 318 such that the fourth buffer amplifier 246 therein may be formed compactly with smaller-sized MOSFETs.

Furthermore, the VCOML is generated at the output of the −1 X charge pump 318 in FIG. 15 instead of at the output of the third buffer amplifier 316. Thus, no margin requirement needs to be met at the contact pad 322 having the VCOML voltage generated thereon. Thus, the low common voltage VCOML may be generated to be in a wider range of −3.3 Volts to 0 Volts.

Also, note that the second external capacitor Cext2' connected to the contact pad 322 having the low common voltage VCOML generated thereon is used by the −1 X charge pump 318. Thus, the apparatus of FIG. 300 has a total of three external capacitors Cext1', Cext2', and Cext3' as compared to the total of four external capacitors Cext1, Cext2, Cext3, and Cext4 for the apparatus 202 of FIGS. 11 and 12.

In addition, note that the external power supply voltage VCI having a higher voltage of +3.3 Volts is still applied at the PWR input (i.e., on the contact pad 320 in FIG. 15) of the −1 X charge pump 318 of the present invention. Such higher voltage of +3.3 Volts as provided directly by an external power supply source results in higher boosting efficiency for the −1 X charge pump 318 of the present invention.

Figure 16:
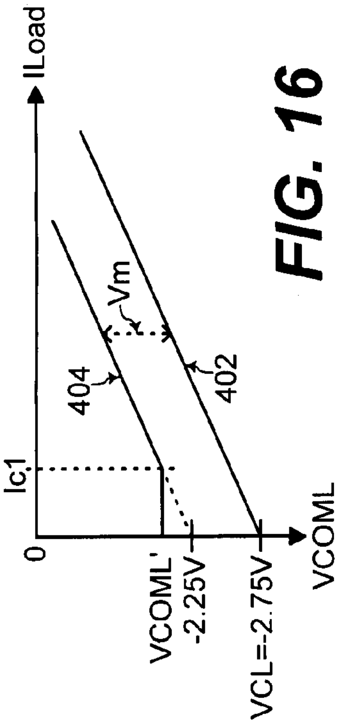
FIG. 16 shows a voltage versus current characteristic at an output node of the apparatus of FIG. 6.

FIG. 16 shows a plot of load current at the contact pad 140 versus the low common voltage VCOML generated thereon for the apparatus 130 of FIG. 6. Referring to FIGS. 6 and 16, a first plot 402 is plotted from VCL=−2.75 Volts and with a slope determined by charging characteristics at the output of the third buffer amplifier 139. A second plot 404 is formed partly by shifting the first plot 402 up by the margin requirement Vm=0.5 Volts of the third buffer amplifier 139. A critical current Ic1 is determined at a point of the second plot 404 when the voltage at the output of the third buffer amplifier 139 begins to rise from an initial desired low common voltage VCOML'.

Figure 17:
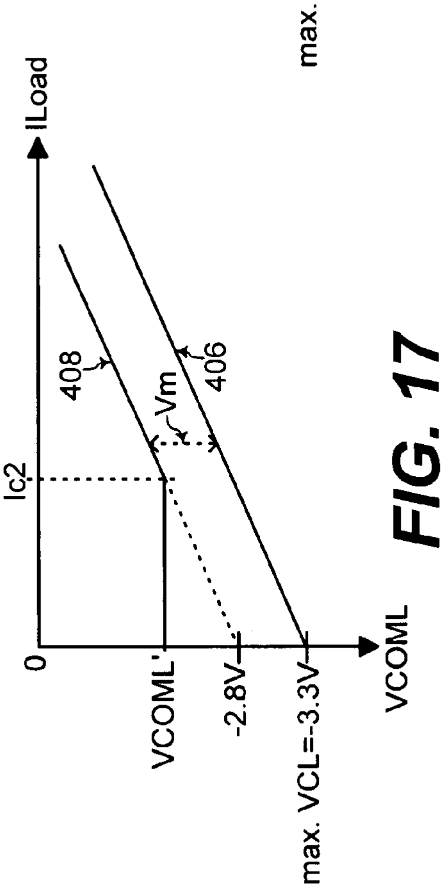
FIG. 17 shows a voltage versus current characteristic at an output node of the apparatus of FIG. 11, according to an embodiment of the present invention.

FIG. 17 shows a plot of load current at the contact pad 234 versus the low common voltage VCOML generated thereon for the apparatus 202 of FIG. 11 according to an embodiment of the present invention. Referring to FIGS. 11 and 17, a first plot 406 is plotted from a maximum VCL=−3.3 Volts and with a slope determined by charging characteristics at the output of the third buffer amplifier 232. A second plot 408 is formed partly by shifting the first plot 406 up by the margin requirement Vm=0.5 Volts of the third buffer amplifier 232.

A critical current Ic2 in FIG. 17 is determined at a point of the second plot 408 when the voltage at the output of the third buffer amplifier 232 begins to rise from an initial desired low common voltage VCOML'. The critical current Ic2 in FIG. 17 is greater than the critical current Ic1 in FIG. 16 since the second plot 408 of FIG. 17 begins at a lower voltage −2.8 Volts than the −2.25 Volts in FIG. 16. Plots 402, 404, 406, and 408 in FIGS. 16 and 17 increase with a same slope.

Figure 18:
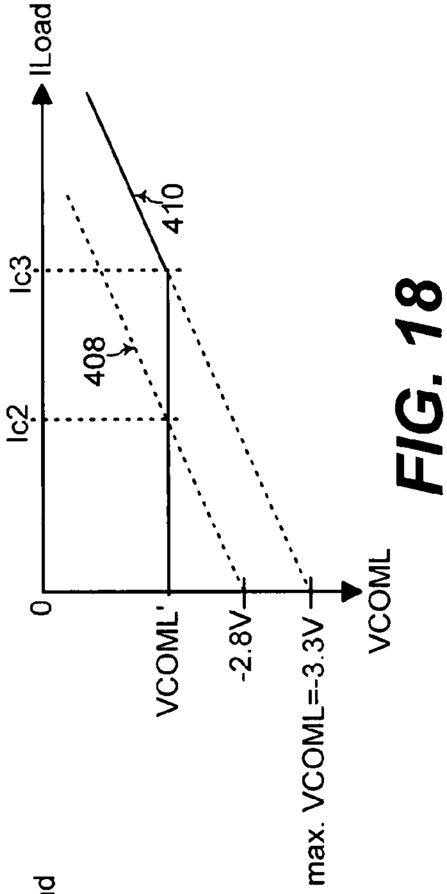
FIG. 18 shows a voltage versus current characteristic at an output node of the apparatus of FIG. 15, according to an embodiment of the present invention.

FIG. 18 shows a plot of load current at the contact pad 322 versus the low common voltage VCOML generated thereon for the apparatus 300 of FIG. 15 according to an embodiment of the present invention. Referring to FIGS. 15 and 18, a plot 410 is plotted from a maximum VCOML=−3.3 Volts and with a slope determined by charging characteristics at the output of the −1 X charge pump 318 which has no margin requirement.

A critical current Ic3 in FIG. 18 is determined at a point of the plot 410 when the voltage at the output of the −1 X charge pump 318 begins to rise from an initial desired low common voltage VCOML'. The critical current Ic3 in FIG. 18 is greater than the critical current Ic1 in FIG. 16 and the critical current Ic2 in FIG. 17 since the plot 410 of FIG. 18 begins at a lowest voltage −3.3 Volts and since plots 402, 404, 406, 408, and 410 in FIGS. 16, 17, and 18 increase with a same slope. Thus, the apparatus 300 of FIG. 18 operates properly to provide a stable VCOML' for a higher range of load current for the display panel 204.

The foregoing is by way of example only and is not intended to be limiting. Thus, any number of elements as illustrated and described herein is by way of example only. The present invention is limited only as defined in the following claims and equivalents thereof.

The invention claimed is:

1. An apparatus for generating a VCOM voltage in a display device, comprising:

a first buffer amplifier that is biased with a high rail voltage and a low rail voltage for generating the VCOM voltage;

a second buffer amplifier that is configured to generate the high rail voltage at an output node of the second buffer amplifier not coupled to an external capacitor;

a charge pump that generates the low rail voltage by charge pumping directly from an external power supply voltage, and wherein the high rail voltage generated by the second buffer amplifier is applied on the charge pump for generating the low rail voltage;

a third buffer amplifier having an input with a first input voltage from a first multiplexer applied thereon and having another input coupled to an output of the third buffer amplifier that is also coupled to an input of the first buffer amplifier; and a fourth buffer amplifier having an input with a second input voltage from a second multiplexer applied thereon and having another input coupled to an output of the fourth buffer amplifier that is also coupled to another input of the first buffer amplifier.

2. The apparatus of claim 1, wherein the low rail voltage generated from the charge pump is −1 times the external power supply voltage.

3. The apparatus of claim 2, wherein the high rail voltage is determined from a process maximum voltage rating and the external power supply voltage.

4. The apparatus of claim 1, wherein the second buffer amplifier includes an operational amplifier configured as a voltage follower that generates the high rail voltage from a reference voltage.

5. The apparatus of claim 1, wherein the first buffer amplifier includes an operational amplifier configured as a voltage regulator that generates the VCOM voltage.

6. The apparatus of claim 1, wherein the charge pump includes:

a plurality of capacitors;

a switching network for switching between the external power supply voltage and a ground voltage for application on the capacitors according to control clock signals; and a plurality of level shifters for level-shifting the control clock signals to generate level-shifted clock signals that are used for controlling the switching network, wherein the level shifters are biased either between the external power supply voltage and the ground voltage or between the high and low rail voltages.

7. The apparatus of claim 1, wherein the display device is a liquid crystal display device, and wherein the VCOM voltage is a low common voltage VCOML.

8. A method of generating a VCOM voltage in a display device, comprising:

biasing a first buffer amplifier with a high rail voltage and a low rail voltage for generating the VCOM voltage;

generating the high rail voltage at an output node of a second buffer amplifier that is not coupled to an external capacitor;

generating the low rail voltage by charge pumping directly from an external power supply voltage, and by level shifting using the high rail voltage during the charge pumping for generating the low rail voltage;

coupling an output of a third buffer amplifier to an input of the first buffer amplifier with the third buffer amplifier having an input with a first input voltage from a first multiplexer applied thereon and having another input coupled to the output of the third buffer amplifier; and coupling an output of a fourth buffer amplifier to another input of the first buffer amplifier with the fourth buffer amplifier having an input with a second input voltage from a second multiplexer applied thereon and having another input coupled to an output of the fourth buffer amplifier.

9. The method of claim 8, wherein the low rail voltage generated from the charge pumping is −1 times the external power supply voltage.

10. The method of claim 9, wherein the high rail voltage is determined from a process maximum voltage rating and the external power supply voltage.

11. The method of claim 8, wherein the second buffer amplifier includes an operational amplifier configured as a voltage follower that generates the high rail voltage from a reference voltage, and wherein the first buffer amplifier includes another operational amplifier configured as a voltage regulator that generates the VCOM voltage.

12. The method of claim 8, wherein the charge pumping includes the steps of:

switching a plurality of capacitors between the external power supply voltage and a ground voltage according to level-shifted control clock signals; and level-shifting initial control clock signals to generate the level-shifted clock signals, wherein the level-shifting is performed using biasing either between the external power supply voltage and the ground voltage or between the high and low rail voltages.

13. The method of claim 8, wherein the display device is a liquid crystal display device, and wherein the VCOM voltage is a low common voltage VCOML.

14. An apparatus for generating VCOM voltages in a display device, comprising:

a buffer amplifier that generates a first VCOM voltage;

a charge pump that generates a second VCOM voltage by charge pumping directly from an external power supply voltage, wherein the first and second VCOM voltages are applied on a common voltage node of the display device; and a comparator that generates a charge pump control signal from comparing the second VCOM voltage generated by the charge pump with a reference voltage that indicates a desired VCOM voltage, wherein the reference voltage is generated from the first VCOM voltage, and wherein the charge pump controls the level of the second VCOM voltage according to the charge pump control signal, and wherein the buffer amplifier generate the first VCOM voltage from a comparison of the reference voltage and a first input voltage generated by a first multiplexer;

and wherein the comparator has a first input with the reference voltage applied thereon and has a second input coupled to an output of another buffer amplifier that compares said output with a second input voltage generated by a second multiplexer.

15. The apparatus of claim 14, further comprising:

a voltage divider for generating a modified VCOM voltage from the second VCOM voltage generated by the charge pump;

wherein the comparator inputs the modified VCOM voltage and the reference voltage for generating the charge pump control signal.

16. The apparatus of claim 15, wherein the charge pump includes:

a first external capacitor; and a switching network for switching between the external power supply voltage and a ground voltage according to control clock signals for application on the first external capacitor and a second external capacitor coupled to a pad having the second VCOM voltage generated thereon; and a plurality of level shifters for level-shifting the control clock signals to generate level-shifted clock signals that are applied on the switching network.

17. The apparatus of claim 16, further comprising:

a buffer amplifier that is configured to generate a high rail voltage at an output node of the buffer amplifier not coupled to an external capacitor;

wherein the level shifters are biased either between the external power supply voltage and the ground voltage or between the high rail voltage and the second VCOM voltage;

and wherein the buffer amplifier includes an operational amplifier configured as a voltage follower that generates the high rail voltage from another reference voltage.

18. The apparatus of claim 14, wherein the second VCOM voltage generated from the charge pump is −1 times the external power supply voltage.

19. The apparatus of claim 14, wherein the display device is a liquid crystal display device, and wherein the second VCOM voltage is a low common voltage VCOML.

20. A method of generating VCOM voltages in a display device, comprising:

generating a first VCOM voltage;

generating a second VCOM voltage by charge pumping directly from an external power supply voltage, wherein the first and second VCOM voltages are applied on a common voltage node of the display device; and generating a charge pump control signal from comparing the second VCOM voltage with a reference voltage that indicates a desired VCOM voltage, wherein the reference voltage is generated from the first VCOM voltage, and wherein the level of the VCOM voltage is controlled according to the charge pump control signal, and wherein the first VCOM voltage is generated by a buffer amplifier from a comparison of the reference voltage and a first input voltage generated by a first multiplexer;

and wherein the charge pump control signal is generated by a comparator having a first input with the reference voltage applied thereon and has a second input coupled to an output of another buffer amplifier that compares said output with a second input voltage generated by a second multiplexer.

21. The method of claim 20, further comprising:

generating a modified VCOM voltage by voltage division of the second VCOM voltage; and comparing the modified VCOM voltage and the reference voltage for generating the charge pump control signal.

22. The method of claim 20, wherein the charge pumping includes:

switching between the external power supply voltage and a ground voltage according to level-shifted control clock signals for application on a first external capacitor and a second external capacitor coupled to a pad having the second VCOM voltage generated thereon;

level-shifting initial control clock signals to generate the level-shifted clock signals; and generating a high rail voltage at an output node of the buffer amplifier not coupled to an external capacitor;

wherein the level-shifting is performed using biasing either between the external power supply voltage and the ground voltage or between the high rail voltage and the second VCOM voltage.

23. The method of claim 22, further comprising:

configuring an operational amplifier as a voltage follower for generating the high rail voltage from another reference voltage.

24. The method of claim 20, wherein the second VCOM voltage generated from the charge pump is −1 times the external power supply voltage.

25. The method of claim 20, wherein the display device is a LCD (liquid crystal display) device, and wherein the second VCOM voltage is a low common voltage VCOML.

* * * * *